(12) United States Patent
Biel et al.

(10) Patent No.: US 7,855,782 B2
(45) Date of Patent: Dec. 21, 2010

(54) LENS INSPECTION SYSTEM USING PHASE CONTRAST IMAGING

(75) Inventors: Roger Biel, Aschaffenburg (DE); Livio Fornasiero, Hamburg (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 12/683,873

(22) Filed: Jan. 7, 2010

(65) Prior Publication Data

US 2010/0157289 A1    Jun. 24, 2010

Related U.S. Application Data

(63) Continuation of application No. 11/602,735, filed on Nov. 21, 2006, now Pat. No. 7,663,742.

(30) Foreign Application Priority Data

Nov. 24, 2005    (EP) .................................. 05025641

(51) Int. Cl.
*G01B 9/00* (2006.01)
(52) U.S. Cl. ..................................................... 356/124
(58) Field of Classification Search ................. 356/124, 356/239.2
See application file for complete search history.

(56) References Cited

U.S. PATENT DOCUMENTS

| | | | |
|---|---|---|---|
| 4,845,356 A * | 7/1989 | Baker ......................... | 250/225 |
| 5,066,120 A * | 11/1991 | Bertrand ...................... | 356/124 |
| 5,333,052 A * | 7/1994 | Finarov ....................... | 356/369 |
| 5,500,732 A | 3/1996 | Ebel et al. | |
| 5,751,475 A * | 5/1998 | Ishiwata et al. ............. | 359/387 |
| 6,047,082 A | 4/2000 | Rhody et al. | |
| 6,134,342 A | 10/2000 | Doke et al. | |
| 6,765,661 B2 * | 7/2004 | Biel et al. .................... | 356/124 |
| 6,914,723 B2 * | 7/2005 | Yun et al. .................... | 359/565 |
| 7,084,970 B2 * | 8/2006 | Weiss et al. ............... | 356/237.5 |
| 7,355,689 B2 | 4/2008 | Almogy et al. | |
| 7,423,747 B2 * | 9/2008 | Biel et al. .................... | 356/246 |
| 2002/0163638 A1 * | 11/2002 | Biel et al. .................... | 356/239.2 |
| 2006/0170910 A1 * | 8/2006 | Almogy et al. ........... | 356/237.1 |
| 2007/0146698 A1 * | 6/2007 | Biel et al. ................. | 356/239.2 |

FOREIGN PATENT DOCUMENTS

| | | |
|---|---|---|
| EP | 0686842 A3 | 5/1997 |
| EP | 1248092 A3 | 2/2004 |
| WO | 99/32869 A1 | 7/1999 |
| WO | 03/073060 A3 | 9/2003 |
| WO | 2004/057297 A1 | 7/2004 |
| WO | 2005/054807 A3 | 6/2005 |

* cited by examiner

*Primary Examiner*—Roy Punnoose
(74) *Attorney, Agent, or Firm*—Robert Ambrose

(57) ABSTRACT

The present invention relates to an inspection system for the automatic inspection of ophthalmic lenses, preferably in an automated lens manufacturing line. The inspection system provides a phase contrast imaging unit and an inspection method using said phase contrast imaging unit designed to recognize defective lenses with an improved degree of reliability but that does not falsely sort out perfect lenses.

20 Claims, 8 Drawing Sheets

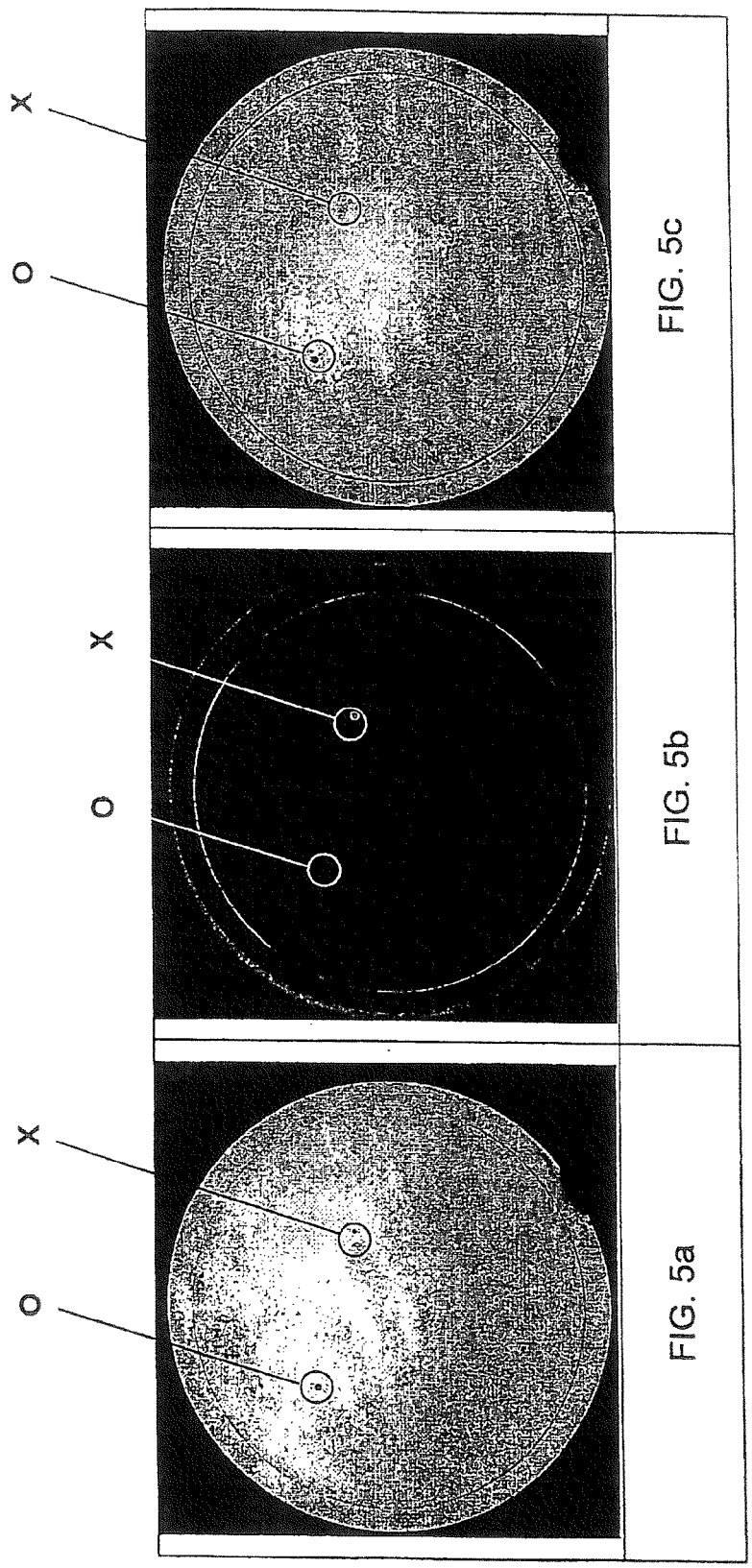

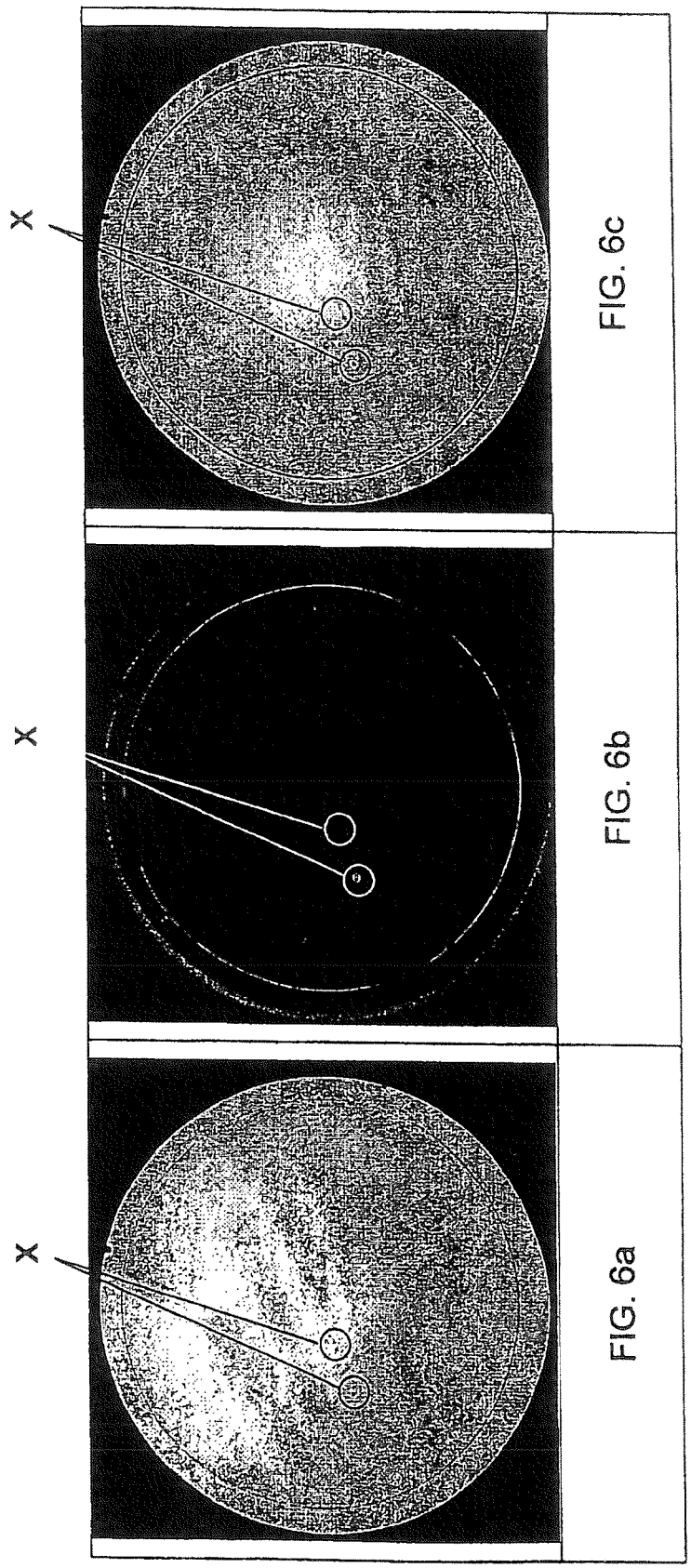

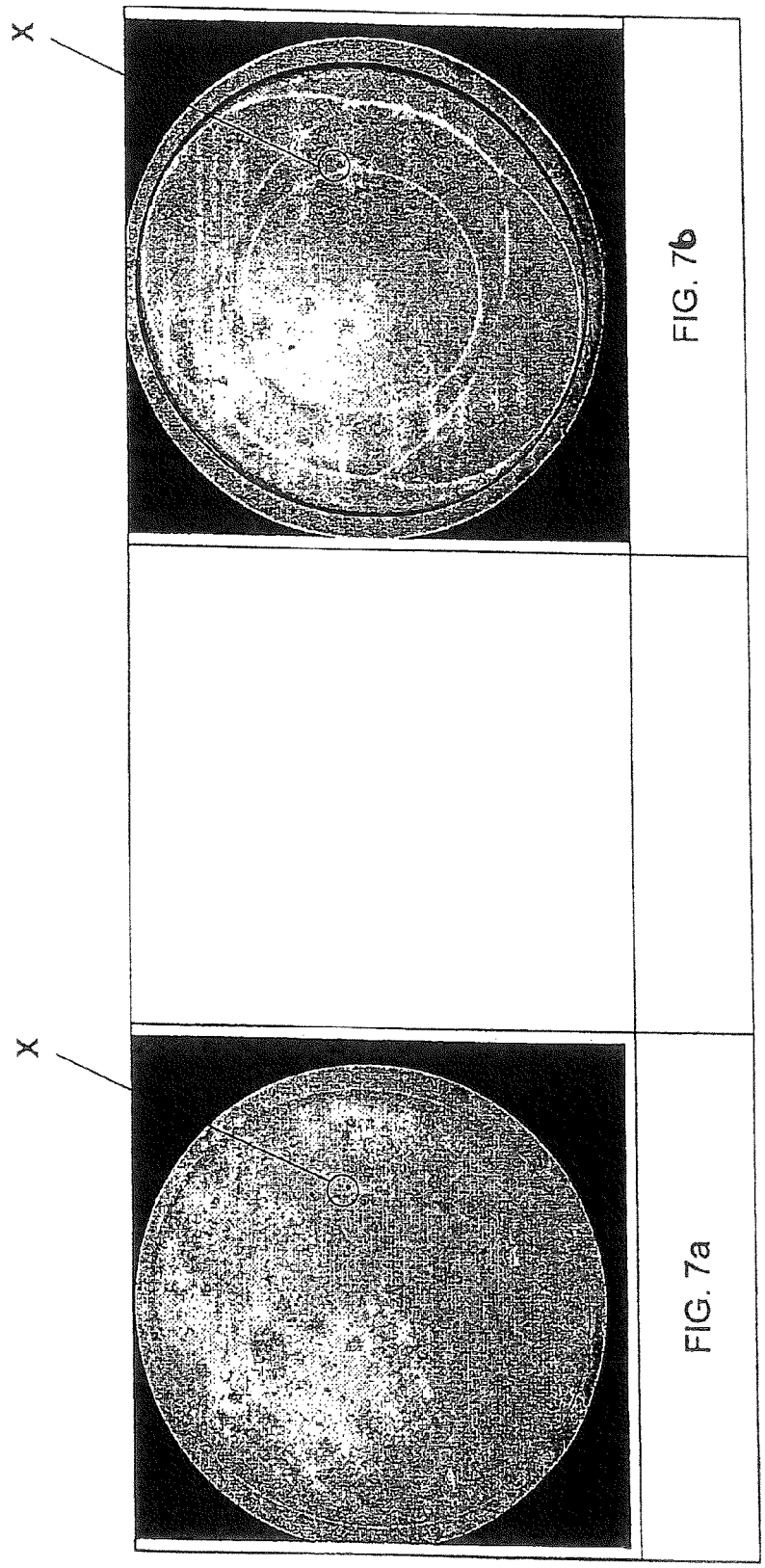

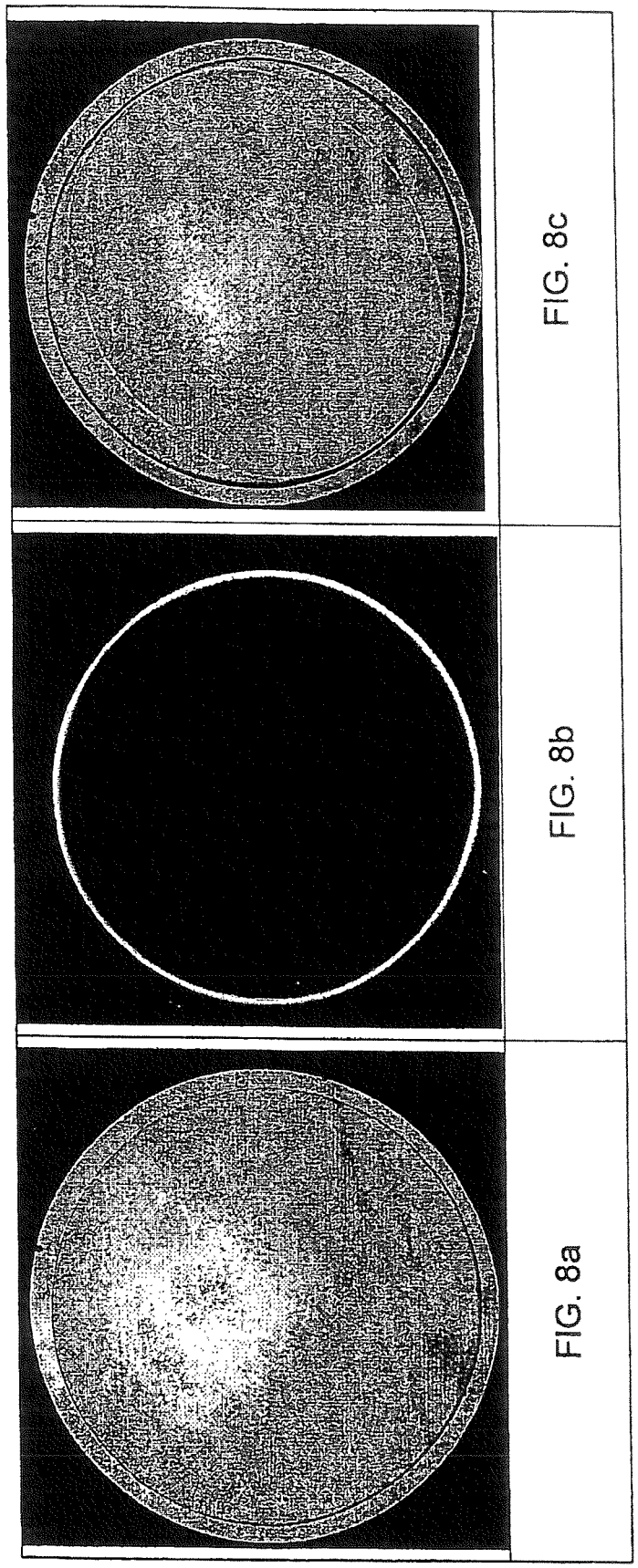

LENS INSPECTION SYSTEM USING PHASE CONTRAST IMAGING

CROSS-REFERENCE TO RELATED APPLICATION

This application is a Continuation of U.S. non-provisional application Ser. No. 11/602,735, filed Nov. 21, 2006, which claims the benefit of European patent application serial no. EP 05025641.1 filed Nov. 21, 2005, the entirety of which is hereby incorporated herein by reference for all purposes.

TECHNICAL FIELD

The present invention relates to an inspection system for the automatic inspection of ophthalmic lenses, preferably in an automated lens manufacturing line. The inspection system provides a phase contrast imaging unit and an inspection method using said phase contrast imaging unit designed to recognize defective lenses with an improved degree of reliability but that does not falsely sort out perfect lenses.

BACKGROUND OF THE INVENTION

Contact lenses from a wide range of materials are nowadays produced in great volume in highly automated manufacturing facilities. Advantageously, these contact lenses are formed using reusable mould halves, the female and the male, which are normally formed from glass or quartz. When mated (mould assembly), these mould halves define a hollow cavity, which corresponds to the subsequent contact lens shape. Before closing the mould halves, a polymer solution is dosed into the female mould half. After closing the mould halves, UV light is radiated over a mould half, which leads to cross linking of the lens material in the lens cavity. Subsequently, the lens is removed from the mould half, for example with suction grips or mechanical grippers, and placed in the package.

Because contact lenses are intended for use in the eye, great care is taken to make sure that lenses meet strict quality control standards. To ensure consistent quality of the contact lenses, automatic inspection of the contact lenses using industrial image processing methods may be implemented. The known methods for inspection of ophthalmic lenses are based on bright-field and/or dark-field imaging.

WO-A-2005/054807 discloses a method for the automatic inspection of contact lenses, in particular tinted contact lenses, in an automatic lens manufacturing process, the method comprising the use of a dark-field inspection unit with the preferred dark-field inspection method being the so-called Schlieren method.

EP-A-1248092 further discloses the combination of a dark-field inspection unit and a bright-field inspection unit, preferably the combination of the so-called Schlieren method and the transmitted light method. The contact lens is subsequently observed in a dark-field and bright-field.

WO-A-2004/057297 discloses a method for optically inspecting and detecting defects in an object using two different light sources, in particular using a dark-field setup as the first detection method and a bright-field setup as the second detection method.

WO-A-03/073060 discloses the dual inspection of ophthalmic lenses using at least two different machine vision inspection techniques in the manufacturing process for said ophthalmic lenses, the preferred at least two inspection techniques being bright field and dark field inspection techniques; others being absorptive inspection, structure light inspection, fluorescence inspection and spectral masking.

WO-A-99/32869 discloses a system for inspecting contact lenses which utilizes a light source and an electronic camera for obtaining images of the lens, as well as a series of masks, including a bright-field mask, a dark-field mask and a transition mask which is constituted by fine stripes, such that the light interacts in a constructive and destructive manner at different distances from the mask. The images are taken subsequently using one mask at a time.

EP-A-0686842 discloses a lens inspection system and method using two optimized bright-field illumination zones, i.e. using light at two different grey levels; one grey level for the centre zone and one grey level for the peripheral zone. Whereas the use of phase contrast (another conceivable inspection method) is considered to be hypersensitive, i.e. enhancing cosmetic flaws to an extent that the lens is rejected for being defective.

To improve production yield and more importantly to improve the quality of the ophthalmic lens and the wearers comfort, there is a need to create a more accurate inspection system. In particular, a suitable inspection system should carry out an exhaustive examination of the ophthalmic lenses for accuracy of size, surface defects, tears, peripheral ruptures and inclusions such as bubbles and foreign bodies, as well as small defects at the edges of an ophthalmic lens.

SUMMARY

The invention solves this problem with the features indicated in claim 1. As far as further essential refinements are concerned, reference is made to the dependent claims.

In one aspect the invention provides a method for inspecting an ophthalmic lens comprising using a phase contrast imaging unit. Preferably the method further comprises using a bright field and/or dark field imaging unit. Even more preferably the method allows selectively employing either the phase contrast and bright-field imaging unit or the phase contrast and dark-field imaging unit. Further preferably the method allows simultaneously employing the bright-field imaging unit and the phase contrast imaging unit.

In another aspect the method of the invention allows simultaneously employing the dark field imaging unit and the phase contrast imaging unit.

In a more preferred aspect, the method is an automatic inspection method in an automated lens manufacturing line.

In another aspect the invention provides an inspection device for the automatic inspection of ophthalmic lenses, in an automated lens manufacturing line comprising a phase contrast imaging unit. Preferably, the device further comprises a bright-field imaging unit and/or a dark-field imaging unit. Even more preferably the device allows selectively employing either the phase contrast and bright-field imaging unit or the phase contrast and dark-field imaging unit. Further preferably the device allows simultaneously employing the bright-field imaging unit and the phase contrast imaging unit. In another aspect the device allows simultaneously employing the dark field imaging unit and the phase contrast imaging unit.

In still another aspect, the present invention may include devices and methods to improve the inspection of tinted or color contact lenses Further details and advantages of the invention may be seen from the description and the drawings that follow.

BRIEF DESCRIPTION OF THE DRAWINGS

FIGS. 5a-c show a comparison of a bright-field (a), a dark-field (b) and a phase contrast (c) image of a defective lens.

FIGS. 6a-c show another comparison of a bright-field (a), a dark-field (b) and a phase contrast (c) image of a defective lens.

FIGS. 7a & b show a comparison of a bright-field (a) and a phase contrast (b) image of a defective toric lens.

FIGS. 8a-c show a comparison of a bright-field (a), a dark-field (b) and a phase contrast (c) image of a toric lens.

DETAILED DESCRIPTION OF THE INVENTION

Figure 1:
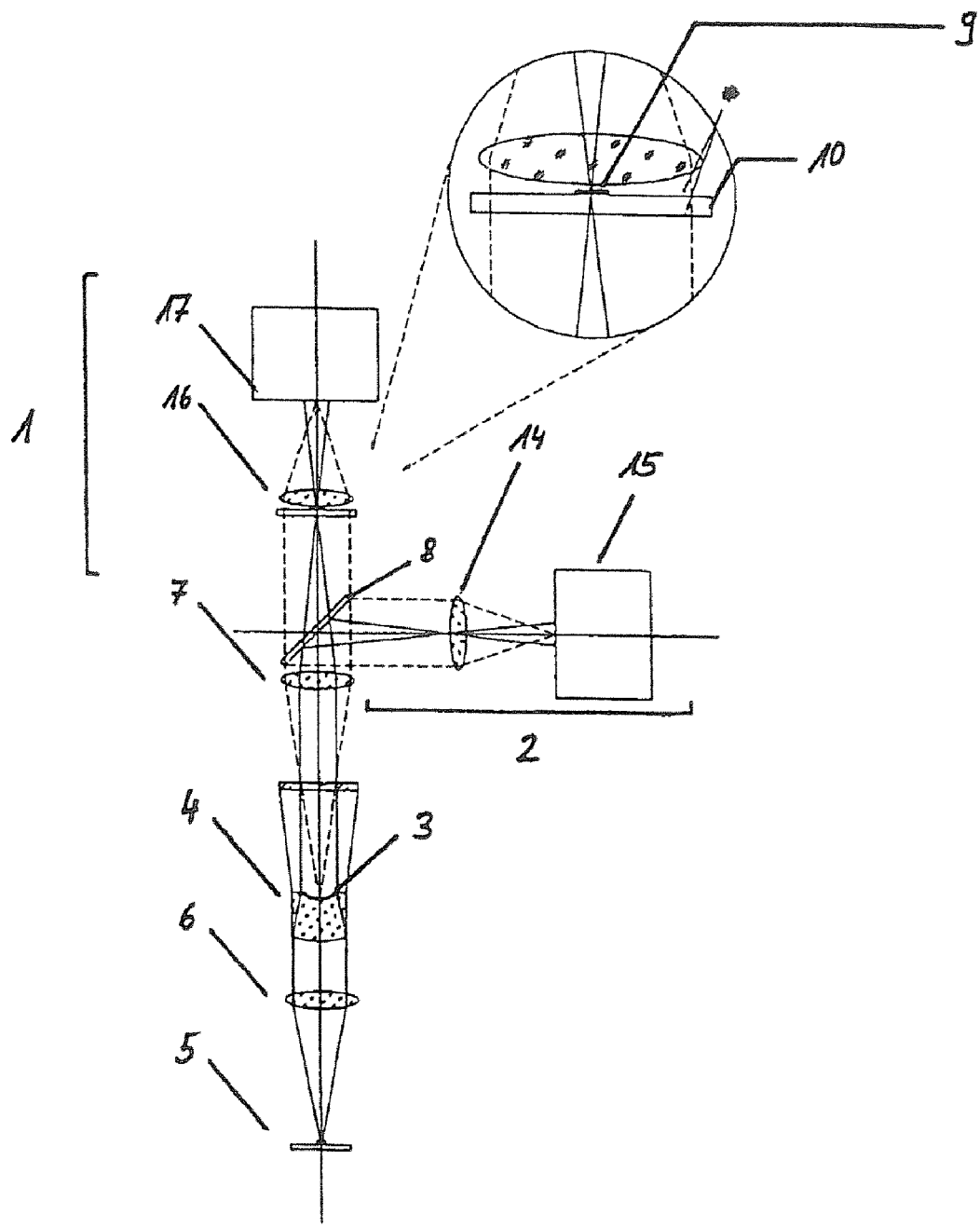
FIG. 1 shows a schematic illustration of an inspection device comprising a phase-contrast imaging unit according to the invention.

According to the present invention ophthalmic lenses are inspected by an inspection method comprising using a phase contrast imaging unit. In alternative embodiments, bright field and/or dark-field imaging may be used to supplement the phase contrast imaging.

The phase contrast technique, as generally known, employs an optical mechanism to translate minute variations in phase into corresponding changes in amplitude, which can be visualized as differences in image contrast. Further, it is known, that phase contrast imaging can be employed as a technique to render a contrast-enhancing effect in imaging transparent specimen.

Contrary to references in the prior art, which consider phase contrast imaging hypersensitive and therefore unsuitable for inspection of ophthalmic lenses, it has surprisingly been found, that phase contrast imaging is in fact suitable for the inspection of ophthalmic lenses and provides for an accurate inspection system. It has further been found, that in particular the combination of phase contrast imaging with either bright-field or dark-field imaging provides a more accurate inspection system. Even further it has been found, that using phase contrast imaging and bright-field imaging simultaneously provides an even more accurate inspection system.

The phase contrast imaging method for inspecting an ophthalmic lens as of the present invention is based on the transformation of refractive index differences into intensity differences whereas bright-field imaging is based on absorption differences. In a preferred aspect of the invention both imaging methods are combined and applied simultaneously.

The basis of the transformation for the phase contrast imaging is the interference property. The result of interference of two waves of light depends upon their phase relationship. There are two extremes. If the two waves meet in exactly the same phase they will interfere in a completely constructive manner, i.e., they will be additive and the intensity of light that results will be the sum of the intensities of the interfering waves. If the two interfering waves are one-half wavelength out of phase, the interference will be totally destructive and the two waves will cancel out. Any other phase relationship will produce intermediate intensity.

The phase contrast imaging unit of the present invention accomplishes two tasks that the bright-field observation alone does not: it separates the background light from the light scattered by the specimen (i.e. the contact lens), and it causes the scattered and unscattered waves to be approximately one-quarter or one-half a wavelength out of phase with each other so that they can destructively interfere and cause changes in intensity.

The phase contrast imaging unit for inspecting an ophthalmic lens of the present invention differs from inspection units known from the prior art by having a phase plate between the specimen and the detector. Any background light which is not deviated or scattered by the specimen passes though the phase plate. When the deviated and undeviated beams of light are recombined further along the light path, the differences in the phase of the deviated and undeviated light beams become additive or subtractive. The resulting wave is the sum of the two waves which have their crests and troughs opposite each other. The resulting wave is up to four times darker than the background. Therefore the specimen appears darker than the background and features on the specimen will be either lighter or darker than the surrounding field. The resulting image, when viewed by a user, or analyzed by a computer program, makes tears and other small defects visible.

It has to be noted, that the present invention is directed to a phase contrast imaging method and system. Therefore, the phase of the light is not analyzed as such (as for example in U.S. Pat. No. 5,066,120), but the difference of intensity due to in-phase or phase-shifted interference is captured as an image. Only then, said image is used for detecting accuracy of size, surface defects, tears, peripheral ruptures and inclusions such as bubbles and foreign bodies, as well as small defects at the edges.

An inspection device according to one embodiment of the invention is illustrated in FIG. 1 and preferably consists of a phase contrast inspection unit 1 and bright-field inspection unit 2. The contact lens 3, which is preferably a soft contact lens, is held in a container 4.

In the phase contrast inspection unit 1, a phase plate 9 is mounted in or near the objective rear focal plane (see enlarged part of FIG. 1) in order to selectively alter the phase and amplitude of the surround (or undeviated) light passing through the specimen.

A phase plate typically is made of a phase retarding material, such as a dielectric thin film on a glass plate 10. Most available phase plates are produced by vacuum deposition of thin dielectric and metallic films onto a glass plate or directly onto a lens surface. The role of the dielectric thin film is to shift the phase of light, while the metallic film attenuates undiffracted light intensity.

A "positive" phase plate produces dark contrast and contains a partially absorbing film designed to reduce the amplitude of the surround wavefront. In addition, this plate contains phase retarding material designed to shift (retard) the phase of the diffracted light by 90 degrees.

A "negative" phase plate also contains both phase retarding and partially absorbing materials. However, in this case, both materials are sandwiched within the phase plate so that the undiffracted surround wavefront is the only species affected (attenuated and retarded in phase by 90 degrees).

In optical terminology, phase plates that alter the phase of surround light relative to diffracted light by 90 degrees (either positive or negative) are termed quarter wavelength plates because of their effect on the optical path difference. As a general rule, when objective numerical aperture and magnification is increased, the phase plate width and diameter both decrease.

In one embodiment of the phase contrast inspection unit, the thin phase plate contains a ring etched into the glass that has reduced thickness in order to differentially advance the phase of the surround wave by a quarter-wavelength. In another preferred embodiment the ring is further coated with a partially absorbing metallic film to reduce the surround light amplitude by 60 to 90 percent.

Because the rear focal plane usually resides near an internal lens element, some phase contrast objectives are produced by actually etching into the surface of a lens.

Referring back to FIG. 1, the contact lens 3 is preferably at least temporarily housed in a container 4 that is transparent at least at the bottom to allow the illumination beam coming from the light source 5 to be transmitted trough the contact lens 3. The container 4 may be open at the top or closed by means of a transparent window. In use, the container 4 is preferably at least partially filled with a fluid solution, such as, for example, water or saline solution or a similar test liquid. Preferably, the shape of the container is such that, when a contact lens is placed in the container the container tends to centre the lens automatically therein at its bottom. The container may stand alone on the transport subsystem or may be part of a lens carrier provided to hold a multitude of containers.

The light source 5 is used to illuminate the contact lens 3 and may be any suitable kind of monochromatic light source generating either a continuous illumination beam or a series of flashes or pulses. In the latter case the inspection system preferably further includes a synchronization or coordination mechanism between the transport subsystem and the light source which takes care that the light source is activated exactly when the contact lens is in the inspection position.

Examples of preferred light sources are light emitting diodes (LEDs) or short arc-xenon flash lamps. Other types of light sources, such as halogen lamps may be used, in which case a filter may be used to create monochromatic light. The light emanating from the light source 5 is then collimated by a suitable lens 6.

To increase the output of light or light intensity, a concave mirror (not shown) may be used. The light reflected by the light source 5 and the concave mirror is then focused onto an input diaphragm (not shown), in a preferred embodiment by a heat filter and a biconvex lens (not shown). The diaphragm lies in the focus point of a further lens, so that the light emanating from the light source 5 is collimated and parallel light is present in the examining zone. It is also possible for an interference filter (not shown) to be additionally used behind the lens 6, in order to substantially increase the length of coherence of the light emanating from the light source 5.

The illumination beam transmitted through the contact lens 3 is incident on an imaging convex lens 7. Past the lens 7 the illumination beam is divided by a beam splitter 8, e.g. a beam-dividing cube. One beam is that of the phase contrast optics and the other beam is given in transmitted light (i.e. directed to the bright field optics).

In an alternative embodiment, the beam splitter may be used in the same way to direct one beam to the phase contrast optics and the other beam to a dark field optics. In another embodiment, the beam splitter may be used to direct one beam to the phase contrast optics and the other beam to a bright and dark field optics.

The imaging units are each completed by a lens 14 and 16 and a CCD camera 15 and 17.

For the illumination beam and the observation beam, achromatic lenses are preferably used, in order to avoid aberrations. Observation is preferably carried out under a small angle.

For an extensive and thorough inspection of contact lenses, in particular tinted contact lenses, a dark-field inspection unit may be used in combination with a bright-field inspection unit and/or a phase contrast imaging unit which more easily recognizes linear surface defects outside the iris print. This dark-field method, characterized by the fact that a beam stop is positioned between the contact lens and the camera was introduced by A. Toepler to examine lenses and it is known in literature as Schlieren method. Schlieren systems are especially effective in detecting cosmetic defects such as surface defects, tears, ruptures and inclusions such as bubbles and foreign bodies.

In an embodiment additionally using dark field imaging, the phase retarding plate 9 may be complemented by a beam stop 13 in the filter plane 12 (both not shown in FIG. 1). Beam stop 13 should advantageously be of larger diameter than the input diaphragm (not shown in FIG. 1), so that the illuminating part of the beam is fully scattered by the imaging properties of the contact lens 3 despite deviations in the illuminating beam. Of course, the beam stop 13 should not be too large, because a disadvantageous number of low frequency parts may be filtered out. Finally, the deviation of the scattered beam is small as compared to the direction of the beam. Using computer-assisted simulation of the path of the beam and the confirmation from the experiments, with an input diaphragm of 1 mm, the size of the beam stop 13 is advantageously 2-3 mm.

In the absence of scattering or refraction of the illumination beam by the contact lens 3, no light is transmitted past the stop 13 and to the CCD camera 17, and the resulting picture is completely dark, with the exception of features of a contact lens that deflect light enough to miss the stop 13. Such features will cause some light to be incident on the pixel array of camera 17. An image of the incident light is preferably taken by a lens 16 of camera 17 for analysis.

Figure 2:
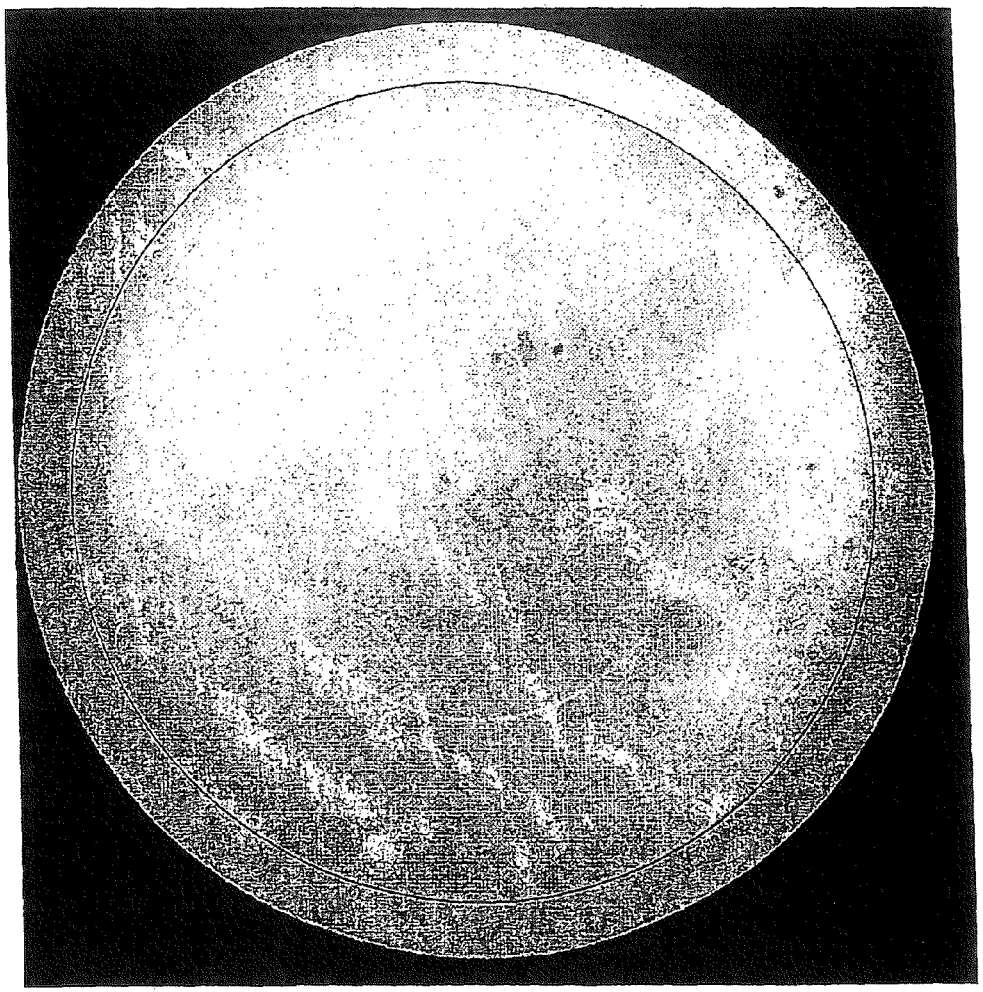
FIG. 2 shows a bright-field image of a contact lens.
Figure 3:
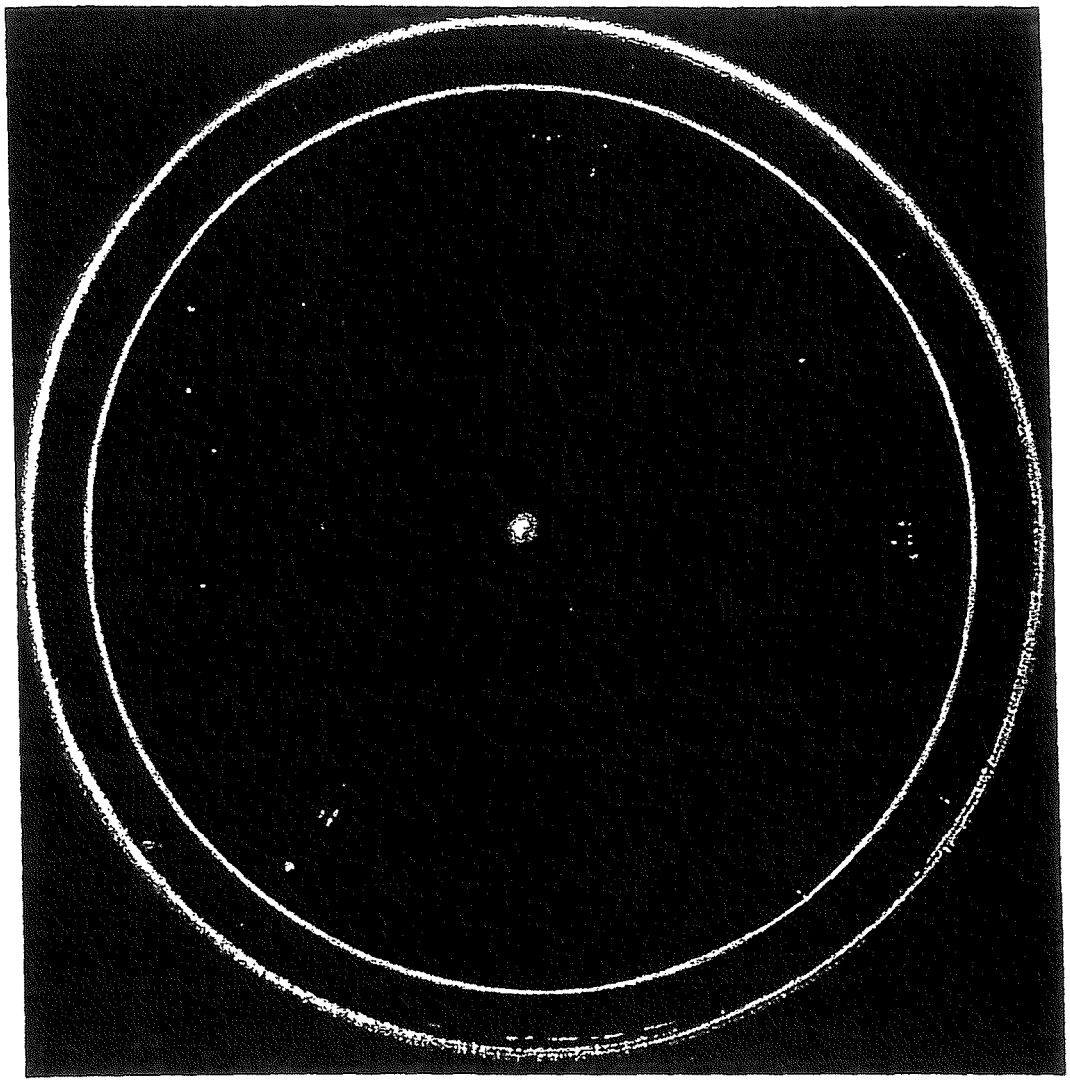
FIG. 3 shows a dark-field image of a contact lens.
Figure 4:
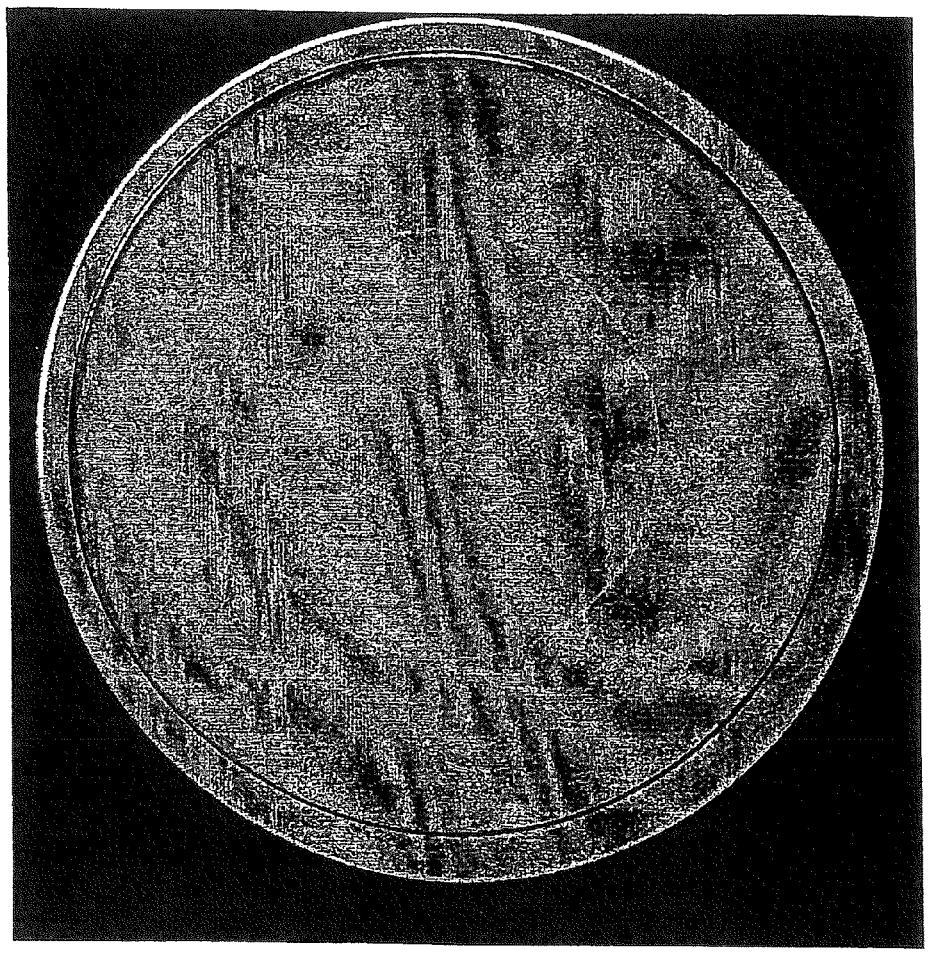
FIG. 4 shows a phase contrast image of a contact lens.

FIGS. 2 to 4 show a bright-field (FIG. 2), a dark-field (FIG. 3) and a phase contrast image (FIG. 4) of a contact lens in high resolution. In FIGS. 5 to 8, the images of lens specimen obtained with bright-field, dark-field and phase contrast imaging are compared.

FIG. 5 features a lens with a bubble in the lens material (X) as well as with an adhering air bubble on the surface of the lens (O). The latter (O) is not a lens defect, whereas the bubble in the lens material (X) is a lens defect which has to be identified by the system and method of the present invention to reject the lens as defective. FIG. 5*a* is the bright-field image, FIG. 5*b* is the dark-field image and FIG. 5*c* is the phase contrast image of the same lens. Only the phase contrast image allows to distinguish X from O, as X shows a bright halo around the defect, whereas O only appears as a black spot. In a combined bright-field and phase contrast imaging method, the first bright-field image (FIG. 5*a*) can be used to identify the area for potential defects, which then is either confirmed or disapproved by the subsequent or simultaneous second phase contrast image (FIG. 5*c*).

FIG. 6 features a lens with two bubbles in the lens material (X), both appearing with a bright halo in the phase contrast image. One of them is poorly visible in FIG. 6*a*, whereas it is clearly visible in FIG. 6*b*. Here the first dark-field image (FIG. 6*b*) can be used to identify the area for potential defects, which then is either confirmed or disapproved by the subsequent or simultaneous second phase contrast image (FIG. 6*c*).

FIG. 7 shows a comparison of a bright-field and a phase contrast image taken simultaneously of the same toric lens. In FIG. 7*a* the bubble in the lens material (X) appears undistinguishable from an adhering air bubble on the surface of the lens (O) as in the previous images. Whereas in FIG. 7*b* the bright halo reveals the true nature of the defect to reject the lens. Here again either phase contrast image (FIG. 7a) alone or the combination with the bright-field image (FIG. 7b) would allow to reliably reject a lens (and only a lens) with true defects.

FIG. 8 shows three images of a toric lens, i.e. a lens where the orientation on the eye is essential for the effective vision correction. Neither the bright-field (FIG. 8a), nor the darkfield (FIG. 8b) image allow to capture the orientation of the lens in the package. However, the phase contrast image (FIG. 8c) clearly reveals the underlying optical design and the respective orientation of the lens.

The present invention is preferably used on a manufacturing line. By an appropriate transport subsystem in a production plant, the specimen (contact lens) is moved along a predetermined path into the lens inspection position wherein one lens at the time is inspected. Preferably the lens is continuously moving through the inspection system, however the lens may also be in a stationary position during the inspection.

Because the resulting dark-field image is not affected by any object in or within the lens which absorbs light such as an iris print, this method is particularly effective to inspect tinted contact lenses. Cosmetic defects which may be hidden by the iris print become clearly detectable.

Regardless of whether phase contrast imaging, phase contrast and bright-field imaging or phase contrast and dark field imaging are used, the image is automatically processed by a computer which decides whether to reject the lens or process it further according to preset selection criteria by any known method in the art.

The methods described above are suitable to inspect any kind of ophthalmic lenses, in particular contact lenses. Preferably the contact lens is a soft contact lens for example a conventional hydrogel lens which comprises for example a poly-HEMA homo or copolymer, a PVA homo or copolymer, or a cross linked polyethylenglycol or a polysiloxane hydrogel. In a more preferred embodiment the contact lens is a tinted contact lens.

The invention claimed is:

1. An apparatus for inspecting an ophthalmic lens comprising in optical connection:
    a light source, wherein the light source projects a primary light beam through a sample ophthalmic lens held in a container;
    a beam splitter, wherein the beam splitter divides the projected primary light beam into at least two secondary light beams;
    a phase contrast imaging unit having an objective rear focal plane; wherein the phase contrast imaging unit displays an image projected by at least one of the at least two secondary light beams;
    a phase plate secured in the objective rear focal plane of the phase contrast imaging unit;
    a bright field imaging unit, wherein the bright field imaging unit displays an image projected by at least one of the at least two secondary light beams; and
    at least one camera sensor operatively coupled with the phase contrast imaging unit, wherein the at least one camera sensor captures an image of the light penetrating through the lens contained in the container.

2. The apparatus of claim 1, wherein the container comprises a transparent bottom.

3. The apparatus of claim 1, wherein the container contains a volume of fluid solution.

4. The apparatus of claim 1, wherein the container has dimensions that automatically center the position of the lens within the container.

5. The apparatus of claim 1, wherein the light source is monochromatic.

6. The apparatus of claim 5, wherein the light source projects a continuous illumination beam.

7. The apparatus of claim 5, wherein the light source projects a pulsated beam.

8. The apparatus of claim 1, wherein the apparatus is integrated with an automatic transport system.

9. The apparatus of claim 1, further comprising a dark field imaging unit, wherein the dark field imaging unit displays an image projected by at least one of the at least two secondary light beams.

10. The apparatus of claim 1, wherein the phase plate shifts the phase and amplitude of undeviated light projected through the lens.

11. The apparatus of claim 1, wherein the phase plate comprises a phase retarding material.

12. The apparatus of claim 11, wherein the phase retarding material is designed to shift the phase of light about 90 degrees relative to the primary beam.

13. The apparatus of claim 12, wherein the phase plate comprises a dielectric film secured to a glass plate.

14. The apparatus of claim 13, wherein the phase plate comprises a glass surface having a ring etched into the glass surface.

15. The apparatus of claim 14, wherein the ring is coated with a metallic film.

16. An apparatus for automatically inspecting an ophthalmic lens, said apparatus comprising:
    a light source, wherein the light source projects a primary light beam through a sample ophthalmic lens held in a container, wherein the primary light beam has phase and amplitude;
    a beam splitter, wherein the beam splitter divides the projected primary light beam into at least two secondary light beams;
    a phase contrast imaging unit comprising an objective rear focal plane, wherein the phase contrast imaging unit displays an image carried by at least one of the at least two secondary light beams;
    a phase plate secured in the objective rear focal plane of the phase contrast imaging unit, wherein the phase plate shifts the phase and amplitude of undeviated light projected through the lens; and
    a bright field imaging unit, wherein the bright field imaging unit displays an image carried by at least one of the at least two secondary light beams.

17. The apparatus of claim 16 further comprising at least one camera sensor incorporated with the phase contrast imaging unit, wherein the at least one camera sensor captures an image of the light projecting through the lens contained in the container.

18. The apparatus of claim 16, further comprising a dark field imaging unit, wherein the dark field imaging unit displays an image carried by at least one of the at least two secondary light beams.

19. An apparatus for inspecting an ophthalmic lens, said apparatus comprising:
    a light source, wherein the light source projects a primary light beam through a sample ophthalmic lens held in a container, wherein the primary light beam has phase and amplitude;
    a beam splitter, wherein the beam splitter divides the projected primary light beam into at least two secondary light beams;

a phase contrast imaging unit, wherein the phase contrast imaging unit displays an image generated by at least one of the at least two secondary light beams;

a phase plate secured in the objective rear focal plane of the phase contrast imaging unit, wherein the phase plate shifts the phase and amplitude of undeviated light projected through the lens; and at least one camera sensor incorporated with the phase contrast imaging unit, wherein the at least one camera sensor captures an image of the light projecting through the lens contained in the container.

20. The apparatus of claim 19 further comprising a bright field imaging unit, wherein the bright field imaging unit displays an image generated by at least one of the at least two secondary light beams.

\* \* \* \* \*